(12) United States Patent
Sandstrom

(10) Patent No.: US 6,932,132 B2
(45) Date of Patent: Aug. 23, 2005

(54) TIRE WITH RUBBER SIDEWALL CONTAINING TRANS POLYBUTADIENE AND BROMINATED COPOLYMER

(75) Inventor: Paul Harry Sandstrom, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 267 days.

(21) Appl. No.: 10/255,236

(22) Filed: Sep. 26, 2002

(65) Prior Publication Data

US 2004/0060630 A1 Apr. 1, 2004

(51) Int. Cl.$^7$ .............................................. B60C 13/00
(52) U.S. Cl. ...................................... 152/525; 152/524
(58) Field of Search ................................ 152/524, 525, 152/DIG. 12; 525/236, 237

(56) References Cited

U.S. PATENT DOCUMENTS

| | | | |
|---|---|---|---|
| 5,504,164 A | * | 4/1996 | O'Donnell .................. 525/346 |
| 5,532,312 A | * | 7/1996 | Gursky et al. ............... 525/232 |
| 5,626,697 A | | 5/1997 | Sandstrom et al. ......... 152/525 |
| 6,255,397 B1 | | 7/2001 | Sandstrom ................... 525/192 |

FOREIGN PATENT DOCUMENTS

| | | | | |
|---|---|---|---|---|
| EP | 801106 A1 | * | 10/1997 | |
| JP | 03-006247 A | * | 1/1991 | ................. 152/525 |

* cited by examiner

*Primary Examiner*—Geoffrey L. Knable
(74) *Attorney, Agent, or Firm*—Henry C. Young, Jr.

(57) ABSTRACT

A pneumatic rubber tire having a sidewall of a rubber composition of elastomers comprised primarily of a combination of a brominated copolymer of isobutylene and para-methylstyrene and high trans 1,4-polybutadiene polymer, of which a minor portion thereof is one or more additional conjugated diene-based elastomers exclusive of any appreciable amount of high cis 1,4-polybutadiene rubber.

10 Claims, No Drawings

TIRE WITH RUBBER SIDEWALL CONTAINING TRANS POLYBUTADIENE AND BROMINATED COPOLYMER

FIELD OF THE INVENTION

A pneumatic rubber tire having a sidewall of a rubber composition of elastomers comprised primarily of a combination of a brominated copolymer of isobutylene and para-methylstyrene and high trans 1,4-polybutadiene polymer of which a minor portion thereof is one or more additional conjugated diene-based elastomers exclusive of any appreciable amount of high cis 1,4-polybutadiene rubber.

BACKGROUND OF THE INVENTION

Pneumatic tires have sidewalls which are conventionally desired to have good scuff resistance (abrasion resistance) and resistance to atmospheric degradation and particularly resistance to ozone degradation. A suitable visual appearance of the tire sidewall surface may also be a desirable property.

Scuff resistance for a tire sidewall rubber composition is typically promoted by inclusion of a high cis 1,4-polybutadiene rubber which is well known to those having skill in such art.

Resistance to atmospheric degradation (e.g. ozone degradation resistance) might be promoted by an inclusion of a saturated elastomer in the sidewall rubber composition, namely an elastomer having little or no olefinic unsaturation such as, for example, an ethylene/propylene/non-conjugated diene rubber (EPDM) or a brominated copolymer of isobutylene and para-methylstyrene. See, for example, U.S. Pat. No. 6,255,397.

Tire rubber sidewalls have heretofore been proposed which contain a high trans 1,4-polybutadiene polymer to promote resistance to tear and improved flex fatigue. See, for example, U.S. Pat. No. 5,626,697. It is to be appreciated that such patent relates to the use of high trans 1,4-polybutadiene polymer in a tire sidewall application without teaching use of saturated type polymers, without significant olefinic unsaturation such as, for example, brominated copolymers of isobutylene and para-methylstyrene as well as EPDM (ethylene/propylene/conjugated diene) type of polymers. The rubber composition of the patent also contained staining antidegradants to provide protection to atmospheric ozone for the diene-based polymers.

However, use of high trans 1,4-polybutadiene rubber, in blends with a brominated copolymer of isobutylene and para-methylstyrene, has been observed to provide improved tear strength (resistance to tear) and improved adhesion to ply and wire coat rubber compositions as compared to blends of high cis 1,4-polybutadiene and a brominated copolymer of isobutylene and para-methylstyrene.

In practice, it remains desirable to provide a rubber tire sidewall of high tear strength and adhesion to other tire components which also possesses suitable ozone resistance and a good black colored surface appearance in the absence of amine-containing antidegradants such as, for example, staining antioxidants or antiozonants.

For this invention, a tire sidewall rubber composition is presented which contains a combination of brominated copolymer of isobutylene and para-methylstyrene and high trans 1,4-polybutadiene polymer instead of a high cis 1,4-polybutadiene rubber in order to improve tear strength and adhesion to rubber tire components such as, for example rubber coated carcass plies and rubber coated wire reinforcement.

In the description of this invention, the term "phr" where used relates to parts by weight of an ingredient per 100 parts by weight of rubber, unless otherwise provided.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless otherwise indicated.

DISCLOSURE AND PRACTICE OF THE INVENTION

In accordance with this invention, a pneumatic rubber tire is provided having a sidewall comprised of an outer visually observable surface wherein said outer sidewall surface is of a rubber composition which contains, based on 100 parts by weight rubber (phr);

(A) 100 phr of elastomers comprised of:
(1) about 20 to about 70, alternately about 30 to about 50, phr of a high trans 1,4-polybutadiene polymer having a trans 1,4-content in a range of about 60 to about 80 percent,
(2) about 30 to about 70, alternately about 40 to about 60, phr of a brominated copolymer of isobutylene and para-methylstyrene polymer, and
(3) from zero to about 30, alternately about 2 to about 15, phr of at least one additional conjugated diene-based elastomer selected from at least one of natural and/or synthetic cis 1,4-polyisoprene rubber and styrene/butadiene copolymer rubber, and
(B) about 15 to about 70 phr of reinforcing filler as:
(1) carbon black, or
(2) combination of carbon black and synthetic precipitated silica, comprised of at least 5 phr of carbon black, optionally with a coupling agent having a moiety reactive with hydroxyl groups (e.g. silanol groups) contained on the precipitated silica and another moiety interactive with said trans 1,4-polybutadiene rubber and additional conjugated diene-based elastomer(s).

It is a significant aspect of this invention that the rubber composition is suitable for a tire sidewall which is subject to scuffing conditions and has good resistance to atmospheric ozone degradation.

In further accordance with this invention, a tire is provided having said visible sidewall rubber composition as a sulfur cured rubber composition. For such tire, the unvulcanized tire assembly, including its sidewall rubber composition, is vulcanized in a suitable mold at an elevated temperature to shape and sulfur-vulcanize the associated rubber compositions of the tire.

Therefore, a significant aspect of this invention is the inclusion of the high trans 1,4-polybutadiene polymer in the sidewall rubber composition instead of an appreciable amount of a high cis 1,4-polybutadiene rubber, all in combination with the brominated copolymer of isobutylene and para-methylstyrene.

It has been observed that the combination of the high trans 1,4-polybutadiene polymer and the brominated copolymer of isobutylene and para-methylstyrene can provide a rubber composition which can act to improve the internal strength properties thereof such as, for example, resistance to tearing (tear strength) and also to improve adhesion to one or more other tire components comprised of diene-based rubber compositions.

Thus, as hereinbefore discussed, the inclusion of the high trans 1,4-polybutadiene instead of the high cis 1,4-polybutadiene rubber with the brominated copolymer of isobutylene and para-methylstyrene has been beneficial in a tire sidewall rubber composition in order to improve its tear resistance and adhesion to one or more other tire components.

In another aspect of the invention, it is sometimes desired to provide a sidewall surface appearance, particularly a black colored sidewall appearance, having a black color due to its carbon black reinforcing filler content, over time and after exposure to atmospheric conditions such as, for example, exposure to ozone, while also providing the aforesaid beneficial properties of the rubber composition itself.

In practice, it has been observed that the surface appearance of a black colored sidewall experiences a reduced degradation upon atmospheric ozone exposure, due to the presence of the brominated copolymer of isobutylene and para-methylstyrene without an olefinic content, and enhancement of various physical properties due to the presence of the trans 1,4-polybutadiene.

In practice, as hereinbefore pointed out, the sidewall rubber composition mayalso contain up to about 30, alternately about 2 to about 15, phr of at least one additional specified conjugated diene-based elastomer selected from at least one of cis 1,4-polyisoprene rubber and styrene/butadiene copolymer rubber. This is intended to be to the exclusion of any significant or appreciable amount of high cis 1,4-polybutadiene rubber and preferably to the exclusion of high cis 1,4-polybutadiene rubber. Such additional styrene/butadiene copolymer elastomer is considered herein to be a conjugated diene-based elastomer. Such styrene/butadiene copolymer rubber may be an organicsolvent solution polymerization prepared styrene/butadiene copolymer rubber or an aqueous emulsion polymerization prepared styrene/butadiene copolymer rubber. If desired, about 2 to about 10 phr of a further, additional, conjugated diene-based elastomer may be used for the rubber composition selected from organic solvent solution polymerization prepared isoprene/butadiene copolymer rubber and organic solution-polymerization prepared styrene/isoprene/butadiene terpolymer rubber. Said additional, and further additional, solvent polymerization prepared elastomer may also be a tin coupled elastomer.

In practice, the cis 1,4-polyisoprene rubber for the rubber composition may be natural or synthetic rubber, usually preferably natural rubber.

In practice, it is preferred that the reinforcing filler is carbon black. If desired, silica, particularly precipitated silica which is also intended to include a synthetic precipitated aluminosilicate, (e.g a synthetic silica precipitated with, or otherwise treated, a very small amount of aluminum) so long as at least 5 phr of the reinforcing filler is carbon black and preferably at least 20 phr of the reinforcing filler is carbon black.

As would be understood by one having skill in such art, a coupling agent would normally be used for said precipitated silica, although the precipitated silica might be used without, and therefore exclusive of, a coupling agent to aid in coupling the precipitated silica to said diene-based elastomers or other ingredients in the rubber composition.

Such coupling agent may be, for example, a bis-(3-triethoxysilylpropyl)polysulfide having an average of from 2 to 2.6 or an average of from 3.5 to 4 connecting sulfur atoms in its polysulfidic bridge. In one aspect of the practice of this invention, such coupling agent is preferably is a bis(3-triethoxysilylpropyl) polysulfide having an average of from 2 to 2.6 connecting sulfur atoms in its polysulfidic bridge. In another aspect of this invention, the bis-(3-triethoxysilylpropyl) polysulfide may be exclusive of such polysulfide having an average of more than 3 connecting sulfur atoms in its polylsulfidic bridge.

In practice, the high trans 1,4-polybutadiene polymer is of a microstructure comprised of a trans 1,4-content in a range of from about 60 to about 80 percent, a cis 1,4-content in a range of about 10 to about 30 percent with the remainder being primarily of a vinyl 1,2-content. The high trans 1,4-polybutadiene polymer, in its unvulcanized state, typically has a Mooney Large (1+4) at 100° C. viscosity value in a range of from about 40 to about 60.

The microstructure of the high trans 1,4-polybutadiene polymer is therefore very different from that of a high cis 1,4-polybutdiene rubber and, for the purpose of this invention, is preferably exclusive of a high cis 1,4-polybutadiene rubber.

The brominated copolymer of isobutylene and para-alkylstyrene for this application is a copolymer comprised of repeat units derived from isobutylene and para-methylstyrene Preferably, the copolymer is composed of from about 85 to about 99 weight percent units derived from isobutylene.

In practice, it is considered herein that the copolymer is post-brominated and has a resultant bromine content of up to about 5 weight percent and, alternately, from about 0.2 to about 1.5 or even up to 2.5 weight percent in the copolymer.

A preferred copolymer is a brominated copolymer of isobutylene and para-methylstyrene as, for example, EXX-PRO from the Exxon Chemical Company reportedly having a Mooney Viscosity ML(1+8) at 125° C. of 50+/−10, an isobutylene content of about 94 to 95 weight percent, and a para-methylstyrene content of about 5 percent, with a total bromine content of about 0.8 weight percent. European patent publication No. EP 0.344.021 contains a description of how to make such copolymer. Also, reference may be made to European Patent Publication No. EP 0801 105.

The rubber compositions of this invention can be prepared by simply mixing the high trans 1,4-polybutadiene and brominated copolymer of isobutylene and para-methylstyrene with appropriate rubber compounding ingredients. This can be done utilizing a wide variety of mixing techniques. In most cases, the mixing will be carried out utilizing an internal rubber mixer or an open roll (e.g. dual opposing rolls) mill mixer. An internal rubber mixer is preferred and the polymers are to be mixed during the non-productive compounding stage.

It should be noted that the non-productive compounds do not contain curatives, such as sulfur, or accelerators. On the other hand, productive compounds contain a curative which will cure (vulcanize) the rubber after it is heated to a curing temperature.

The rubber compositions of this invention will frequently contain a variety of additional compounding ingredients and/or additives. Typical amounts of processing aids and rubber compounding ingredients may, for example, comprise about 1 to about 50 phr. Such processing aids can include, for example, aromatic, naphthenic, and/or paraffinic processing oils. Stearic acid is typically referred to as a "rubber compounding ingredient". As purchased, it typically contains primarily stearic acid with small amounts of at least one of oleic acid, linolenic acid and/or palmitic acid. The mixture may also contain small amounts (less than about six weight percent) of myristic acid, arachidic acid and/or arachidonic acid Such material, or mixture, is conventionally referred to in the rubber compounding art as "stearic acid".

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide, alkyl phenol polysulfides or sulfur olefin adducts. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from 2 to 2.5, being preferred. It is to be appreciated, however, that the cure system, including desired cure package ingredients as well as the following discussion concerning cure accelerators, may vary depending upon the rubber compound ingredients, including the chosen polymers and elastomers.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.8, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate, thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

As hereinbefore discussed in an alternative embodiment of this invention, the formulation can additionally contain silica, usually with a silica coupling agent; and in combination with carbon black.

The commonly employed siliceous pigments used in rubber compounding applications can be used as the silica in this invention are preferably synthetic precipitated silicas The precipitated silicas employed in this invention are, for example, obtained by the acidification of a soluble silicate, e.g., sodium silicate.

The presence and relative amounts of the above additives are considered to be not a significant aspect of the present invention which is more primarily directed to the utilization of a combination of a high trans 1,4-polybutadiene polymer and a brominated copolymer of isobutylene and para-methylstyrene in a tire sidewall rubber composition.

The tire, with its visible rubber sidewall, can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Two samples were prepared to evaluate the use of a high trans 1,4-polybutadiene rubber, in place of a high cis 1,4-polybutadiene rubber, in combination with a brominated copolymer of isobutylene and para-methylstyrene.

For this Example, Samples A and B were prepared. Sample A is a Control Sample using high cis 1,4-polybutadiene rubber and Sample B contains a high trans 1,4-polybutadiene rubber.

The elastomer based compositions for the Samples are prepared from ingredients presented in the following Table 1. Amounts of conventional rubber processing oil and polybutadiene polymers are shown in Table 2 and the corresponding Samples represented as Samples A and B together with various associated physical properties thereof.

Samples A and B were prepared in a three stage, sequential, mixing process in an internal rubber mixer, namely, a first and second non-productive mixing stage in an internal rubber mixer followed by a productive mixing stage in an internal rubber mixer.

The elastomers and indicated compounding ingredients are added in the first, non-productive, mixing stage The second non-productive stage is a re-mixing of the composition formed by mixing the ingredients added in the aforesaid first mixing stage.

In particular, the mixing is conducted in the first stage for about four minutes to a temperature of about 160° C., dumped from the internal rubber mixer, open roll milled for about 30 seconds, sheeted out and allowed to cool to a temperature below 30° C. The resulting rubber composition is then re-mixed in a second mixing stage for about two minutes to a temperature of about 150° C., dumped from the internal rubber mixer, open roll milled for about 30 seconds, sheeted out and allowed to cool to a temperature below 30° C.

In a subsequent mixing stage (a productive mixing stage in an internal rubber mixer), the sulfur curative and accelerator(s) are mixed with the rubber composition and the mixture mixed for about two minutes to a temperature of about 110° C., dumped from the rubber mixer, open roll milled for about 30 seconds, sheeted out, and allowed to cool to a temperature below 30° C.

The various ingredients are shown in the following Table 1.

TABLE 1

| | Parts by Weight |
|---|---|
| First Non-Productive Mix Stage | |
| High cis 1,4-polybutadiene rubber[1] | 0 or 40 |

TABLE 1-continued

| | Parts by Weight |
|---|---|
| High trans 1,4-polybutadiene rubber[2] | 0 or 40 |
| Brominated copolymer of isobutylene and p-methylstyrene[3] | 50 |
| Natural rubber | 10 |
| Carbon black[4] | 40 |
| Processing aid/fatty acid[5] | 6 |
| Naphthenic/paraffinic rubber processing oil[6] | 17 |
| Productive Mix Stage | |
| Zinc oxide | 0.75 |
| Stearic acid | 0.5 |
| Sulfur | 0.4 |
| Accelerators[7] | 1.4 |

[1]Cis 1,4-polybutadiene rubber obtained as BUDENE ® 1207 from The Goodyear Tire & Rubber Company having a cis 1,4-content of about 98 percent and a Tg of about −103° C.
[2]Trans 1,4-polybutadiene rubber prepared by solution polymerization as BUDENE ® 1209 from The Goodyear Tire & Rubber Company, having a trans 1,4-content of about 70 percent, a cis 1,4-content of about 20 percent, a vinyl 1,2-content of about 10 percent and a Tg of about −90° C.
[3]Brominated copolymer of isobutylene and para-methylstyrene obtained as MDX 93-4 ™ from the Exxon Chemical Company
[4]N660 carbon black, an ASTM designation
[5]Struktol 60NS processing aid and stearic acid
[6]Naphthenic/paraffinic rubber processing oil as Flexon 641 ™ from the Exxon Mobil Company
[7]Combination of benzothiazole disulfide (MBTS) and alkyl phenol polysulfide The Samples were prepared from the formulation represented in Table 1 using the indicated amounts of high cis 1,4-polybutadiene and high trans 1,4-polybutadiene shown in Table 2. The resulting Samples were vulcanized in a suitable mold for about 36 minutes to a temperature of about 150° C. Various physical properties of the vulcanized Samples are also shown in Table 2.

The stress-strain, hardness and rebound physical properties were determined with a ring tensile specimen on an automated basis via an Automated Testing System instrument (ATS).

TABLE 2

| | Samples (parts by weight) Control | |
|---|---|---|
| | A | B |
| Polybutadiene Ingredients | | |
| High cis 1,4-polybutadiene | 40 | 0 |
| High trans 1,4-polybutadiene | 0 | 40 |
| Properties | | |
| Rheometer (150° C.) | | |
| Maximum torque (dNm) | 7.8 | 7 |
| Minimum torque (dNm) | 1.2 | 1.1 |
| Delta torque | 6.6 | 5.9 |
| T90, minutes | 8.1 | 9 |
| Stress-Strain | | |
| Tensile (MPa) | 13.4 | 11.5 |
| Elongation (%) | 670 | 650 |
| Modulus, 100% (MPa) | 1.2 | 1.1 |
| Modulus, 300% (MPa) | 5 | 4.5 |
| Rebound, 100° C. (%), Zwick | 58 | 55 |
| Hardness, Shore A, 100° C. | 43 | 41 |
| Tear strength, N, 95° C. | 47 | 76 |
| Adhesion to ply coat | 48 | 80 |
| Adhesion to wire coat | 40 | 60 |
| Ozone, Visual Evaluation | | |
| Static ozone test, 25%[1] | 0 | 0 |
| Kinetic ozone test, 25%[2] | 0 | 0 |
| Cyclic ozone test[3], 21 days of testing | 0 | 0 |
| Pierced groove flex test (minutes to 1.27 cm crack)[4] | 240 | 240 |

[1]Static ozone test of the cured Samples, of a size of about 15.2 cm by 1.3 cm, in an enclosed container in an atmosphere which contains 50 pphm (parts per 100 million gaseous concentration) at about 23° C. and 25 percent strain (25% elongation) for about 48 hours. A visual rating of zero indicates no cracking of the sample
[2]The Kinetic test is conducted in a manner similar to the above Static test except that the Samples are dynamically continuously flexed, without relaxation, during the test. A visual inspection of the resulting Samples indicated no cracks and therefore a rating of zero was given
[3]The Cyclic test is conducted in a manner similar to the above Static test except that Samples undergo a series of continuous cycles of dynamic flexing and relaxing during the test. Samples A and B did not break after 21 days of testing and showed no surface cracks.
[4]Pierced Groove Flex test is a measure of crack growth during dynamic continuous flexing without relaxation of the Sample and is expressed herein as the time in minutes to reach a crack growth of 2.54 cm (or one inch), wherein a higher value is considered as being better.

From Table 2 it can be seen that all of the ozone test Samples showed no evidence of ozone cracking for both of the Samples A and B. Tear strength for Sample B was superior to Control Sample A. Adhesion values to ply and wire coat compounds, as represented by the peel adhesion test for sample B are superior when compared to Control Sample A.

Therefore, the data presented in Table 2 shows a beneficial improvement in one or more physical properties by replacing the cis 1,4-polybutadiene with the trans 1,4-polybutadiene.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a sidewall comprised of an outer visually observable surface wherein said outer sidewall surface is of a rubber composition which is exclusive of a high cis 1,4-polybutadiene rubber and contains, based on 100 parts by weight rubber (phr);
   (A) 100 phr of elastomers consisting essentially of:
      (1) about 30 to about 50 phr of a high trans 1,4-polybutadiene polymer having a trans 1,4-content in a range of about 60 to about 80 percent,
      (2) about 40 to about 60phr of a brominated copolymer of isobutylene and para-methylstyrene polymer, and
      (3) about 2 to about 15 phr of at least one additional conjugated diene-based elastomer selected from the group consisting of at least one of natural and/or synthetic cis 1,4-polyisoprene rubber and styrene/butadiene copolymer rubber, and
   (B) about 15 to about 70 phr of reinforcing filler as:
      (1) carbon black, or
      (2) combination of carbon black and synthetic precipitated silica comprised of at least 5 phr of carbon black, with a coupling agent having a moiety reactive with hydroxyl groups contained on the precipitated silica and another moiety interactive with said trans 1,4-polybutadiene rubber and additional conjugated diene-based elastomer(s).

2. The tire of claim 1 wherein said high trans 1,4-polybutadiene polymer is of a microstructure comprised of a trans 1,4-content in a range of from about 60 to about 80 percent, a cis 1,4-content in a range of about 10 to about 30 percent with the remainder being primarily of a vinyl 1,2-content.

3. The tire of claim 1 wherein said high trans 1,4-polybutadiene polymer, in its unvulcanized state, has a Mooney Large (1+4), at 100° C., viscosity value in a range of from about 40 to about 60.

4. The tire of claim 1 wherein said reinforcing filler is carbon black.

5. The tire of claim 1 wherein said reinforcing filler is carbon black and precipitated silica and wherein at least 20 phr of the reinforcing filler is carbon black.

6. The tire of claim 1 wherein said reinforcing filler is carbon black and precipitated silica and which contains a coupling agent as a bis-(3-triethoxysilylpropyl) polysulfide having an average of from 2 to 2.6 or an average of from 3.5 to 4 connecting sulfur atoms in its polysulfidic bridge.

7. The tire of claim 6 wherein said coupling agent is a bis(3-triethoxysilylpropyl) polysulfide having an average of from 2 to 2.6 connecting sulfur atoms in its polysulfidic bridge and is exclusive of such polysulfide having an average of more than 2.6 connecting sulfur atoms in its polylsulfidic bridge.

8. The tire of claim 1 wherein the brominated copolymer of isobutylene and para-methylstyrene is a copolymer comprised of repeat units derived from isobutylene and para-methylstyrene wherein said copolymer is composed of from about 85 to about 99 weight percent units derived from isobutylene and has a bromine content of from about 0.2 to about 1.5 weight percent in the copolymer.

9. The tire of claim 1 wherein said additional conjugated diene-based elastomer, to the exclusion of high cis 1,4-polybutadiene rubber, is selected from at least one of natural cis 1,4-polyisoprene rubber, an organic solvent solution polymerization prepared styrene/butadiene copolymer rubber or an aqueous emulsion polymerization prepared styrene/butadiene copolymer rubber.

10. The tire of claim 9 wherein said solvent polymerization prepared styrene/butadiene copolymer elastomer is a tin coupled elastomer.

\* \* \* \* \*